(12) United States Patent
Quix et al.

(10) Patent No.: US 11,541,722 B2
(45) Date of Patent: Jan. 3, 2023

(54) HEATING SYSTEM AND METHOD FOR HEATING THE INTERIOR OF A VEHICLE AND MOTOR VEHICLE

(71) Applicant: Ford Global Technologies, LLC, Dearborn, MI (US)

(72) Inventors: Hans Guenter Quix, Herzogenrath (DE); Claudia Katharina Herudek, Aachen (DE); Florian Huth, Cologne (DE); Andreas Schmitt, Aachen (DE); David van Bebber, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 837 days.

(21) Appl. No.: 16/452,711

(22) Filed: Jun. 26, 2019

(65) Prior Publication Data

US 2020/0001685 A1    Jan. 2, 2020

(30) Foreign Application Priority Data

Jun. 29, 2018   (DE) .......................... 102018210787.4

(51) Int. Cl.
| | | |
|---|---|---|
| *B60H 1/03* | (2006.01) | |
| *B60H 1/00* | (2006.01) | |
| *B60H 1/14* | (2006.01) | |

(52) U.S. Cl.
CPC ............. *B60H 1/034* (2013.01); *B60H 1/004* (2013.01); *B60H 1/00328* (2013.01); *B60H 1/00492* (2013.01); *B60H 1/039* (2019.05); *B60H 1/143* (2013.01)

(58) Field of Classification Search
CPC ............ B60H 1/00321; B60H 1/00328; B60H 1/034; B60H 1/039; B60H 1/004; B60H 1/00492; B60H 1/143; B60H 2001/0015; C09K 5/06; F24F 5/0021; F24F 2012/007;
(Continued)

(56) References Cited

U.S. PATENT DOCUMENTS

| | | | | |
|---|---|---|---|---|
| 5,725,048 A | * | 3/1998 | Burk ..................... | B60H 1/034 237/12.3 A |
| 7,134,483 B2 | * | 11/2006 | Barnwell ............. | B01D 53/265 62/93 |

(Continued)

FOREIGN PATENT DOCUMENTS

| | | | |
|---|---|---|---|
| DE | 3245027 A1 | 6/1984 | |
| DE | 19900358 A1 * | 7/2000 | ............... F24D 5/12 |

(Continued)

OTHER PUBLICATIONS

JP4781809B2 English Machine Translation (Year: 2011).*
WO2010060524A1 English Machine Translation (Year: 2010).*

*Primary Examiner* — Jenna M Hopkins
(74) *Attorney, Agent, or Firm* — Vichit Chea; Price Heneveld LLP

(57) ABSTRACT

A heating system and method for heating the interior of a vehicle, such as a motor vehicle, which has an air-air heat exchanger having a heat storage medium, and which is configured to transfer heat between exhaust air, drawn out of the interior, and intake air, supplied to the interior from the vehicle environment, between the exhaust air and the heat storage medium, and between the intake air and the heat storage medium.

18 Claims, 4 Drawing Sheets

(58) Field of Classification Search
CPC .......... F24F 12/001; F24F 3/147; F28F 20/02; F28F 20/025
See application file for complete search history.

(56) References Cited

U.S. PATENT DOCUMENTS

| | | | |
|---|---|---|---|
| 2011/0308265 A1* | 12/2011 | Phannavong | ............ F24F 11/70 62/160 |
| 2014/0027091 A1* | 1/2014 | Schneider | .......... B60H 1/00428 165/47 |
| 2014/0041829 A1* | 2/2014 | Taniguchi | .......... B60H 1/00321 165/42 |
| 2020/0114723 A1* | 4/2020 | Tani | ................... B60H 1/00842 |

FOREIGN PATENT DOCUMENTS

| | | | | |
|---|---|---|---|---|
| DE | 102011075284 A1 | | 11/2012 | |
| DE | 102013110562 A1 | | 3/2015 | |
| DE | 102014012706 A1 | | 3/2016 | |
| DE | 102015115196 A1 | * | 3/2017 | ......... B60H 1/00321 |
| GB | 2518941 A | * | 4/2015 | ......... B60H 1/00364 |
| JP | 4781809 B2 | * | 9/2011 | |
| WO | WO-2010060524 A1 | * | 6/2010 | ......... F28D 20/0056 |

* cited by examiner

HEATING SYSTEM AND METHOD FOR HEATING THE INTERIOR OF A VEHICLE AND MOTOR VEHICLE

FIELD OF THE INVENTION

The present invention generally relates to vehicle heating, and more particularly relates to a heating system and method for heating the interior of a vehicle.

BACKGROUND OF THE INVENTION

Current and future vehicle drive systems may generate only a small amount of waste heat, owing to their improved efficiency. Electric drive systems, especially, may provide only a small amount of usable waste heat, or in some cases even none, following a cold start, because of their high efficiency.

For interior comfort and for keeping the windows mist-free, or de-icing the windows (defrost function), electrical, ancillary heating systems are commonly installed in the vehicle. These ancillary heating systems frequently result in a greater fuel consumption, insofar as the electrical energy is generated by conversion of chemical energy contained in the fuel, e.g., in conventional internal-combustion engines. In the case of electric drives, the energy demand of the ancillary heating systems is for the most part covered by the electrical energy stored in the traction battery.

It may be desirable to improve the efficiency of heating systems in a vehicle and increase the driving range.

SUMMARY OF THE INVENTION

According to one aspect of the present invention, a heating system for heating an interior of a vehicle is provided. The heating system includes an air-air heat exchanger having a heat storage medium and configured to transfer heat between exhaust air, drawn out of the interior, and intake air, supplied to the interior from a vehicle environment, between the exhaust air and the heat storage medium, and between the intake air and the heat storage medium.

According to another aspect of the present invention, a motor vehicle is provided. The motor vehicle includes an interior, and a heating system for heating the interior and comprising an air-air heat exchanger having a heat storage medium, wherein the air-air heat exchanger is configured to transfer heat between exhaust air, drawn out of the interior, and intake air, supplied to the interior from a vehicle environment, between the exhaust air and the heat storage medium, and between the intake air and the heat storage medium.

According to a further aspect of the present invention, a method for heating an interior of a vehicle is provided. The method includes the steps of supplying intake air from a vehicle environment to an air-air heat exchanger having a heat storage medium, supplying exhaust air from the interior to the air-air heat exchanger, and transferring heat from the exhaust air to the intake air, from the exhaust air to the heat storage medium, and/or from the heat storage medium to the intake air by use of the air-air heat exchanger.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
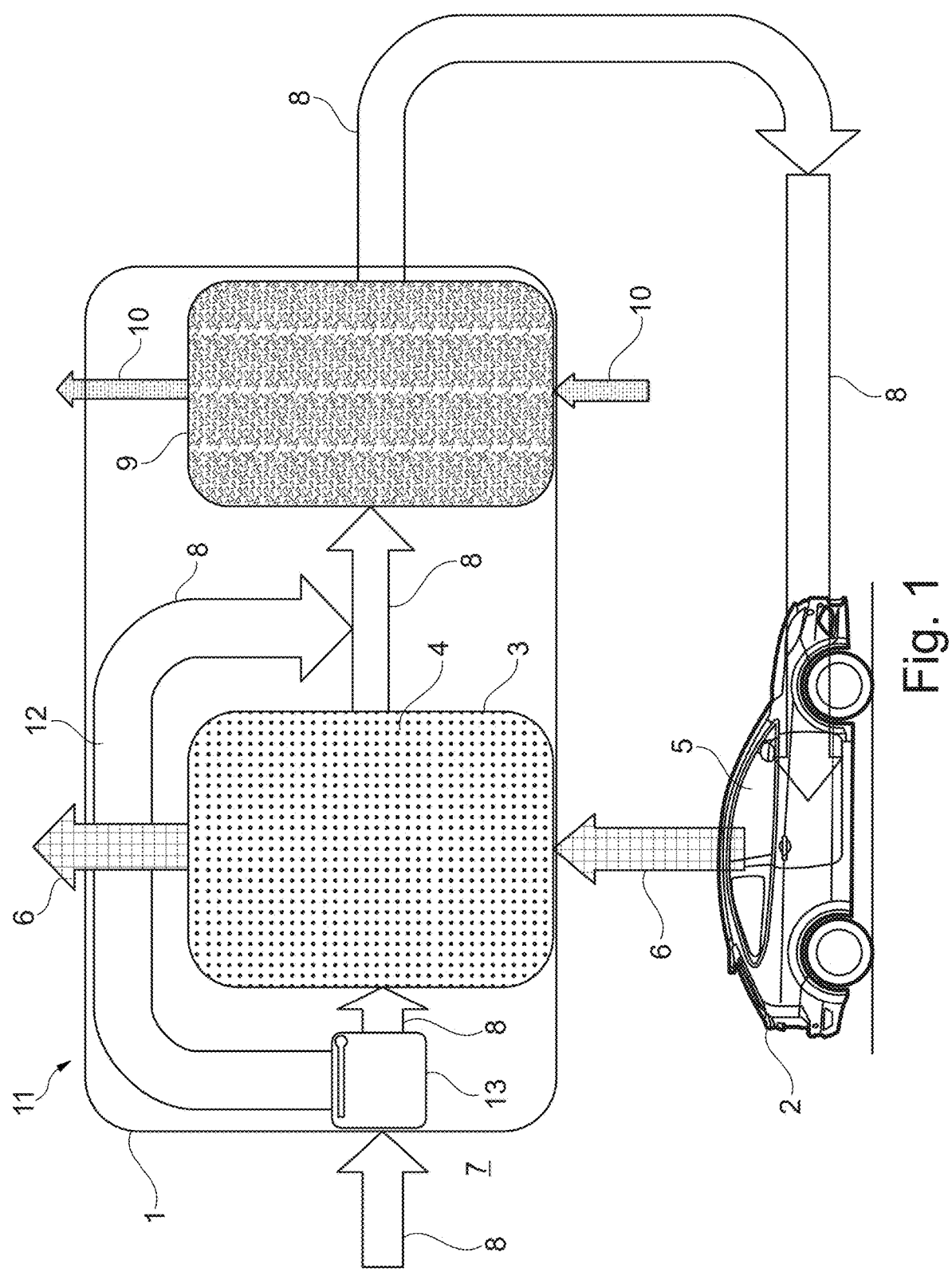
FIG. 1 is a schematic diagram of a heating system located in a vehicle, according to one embodiment.

A heating system 1 for a vehicle 2 is illustrated in FIG. 1, according to one embodiment. The heating system 1 is arranged within the vehicle 2 and serves to heat the interior 5 of the vehicle 2. In FIG. 1, merely to simplify the illustration, the heating system 1 is represented outside of the vehicle 2.

The heating system 1 has an air-air heat exchanger 3 which has a phase-change material that serves as a heat storage medium 4. The air-air heat exchanger 3 is an air to air heat exchanger that transfers heat between two air mediums, namely, the exhaust air 6 which is the exhaust air out of the interior and intake air 8 which is the intake air to the interior. With the use of the air-air heat exchanger 3, heat can be transferred between the exhaust air 6, which is drawn out of the interior 5 of the vehicle 2, and the intake air 8, which is supplied to the interior 5 of the vehicle 1 from the vehicle environment 7. In other words, excess heat of the exhaust air 6 can be transferred to the intake air 8.

The heating system 1 additionally has an air-coolant heat exchanger 9, which is arranged downstream of the air-air heat exchanger 3. The air-coolant heat exchanger 9 is an air to coolant heat exchanger that transfers heat between air and coolant, namely the intake air 8 and the coolant 10. With the use of the air-coolant heat exchanger 9, heat can be transferred between a heated coolant 10 and the intake air 8. In other words, excess heat of the coolant 10 can be transferred to the intake air 8. The coolant 10 may have been heated, or be able to be heated, for example, by waste heat of an internal combustion engine, waste heat of other components, such as components of an electric drive system, or waste heat produced during a battery charging operation. Optionally, the coolant may also be heated electrically such as by electrical energy that is generated by recuperation.

The heating system 1 additionally has a bypass 11 by which, for the intake air 8, the air-air heat exchanger 3 can be bypassed. For this purpose, the bypass 11 has a bypass channel 12 and a flow control device 13, which in the exemplary embodiment is realized as an air regulating flap that may be moved to different positions to control the intake air flow. Depending on the position of the air regulating flap, it can be determined whether the intake air flows through the bypass channel 12 or through the air-air heat exchanger 3. For this purpose, the air regulating flap may be controlled by a control unit such as a microprocessor or other analog and/or digital control circuitry in dependence on the temperature of the intake air 8 and/or the temperature of the exhaust air 6 and/or the temperature of the coolant 10, and a desired temperature of the interior 5.

Optionally, the heating system 1 may have electrical heating elements which may heat the heat storage medium 4. Further, optionally, heating of the heat storage medium 4 by use of a tempering device may be provided.

Figure 2:
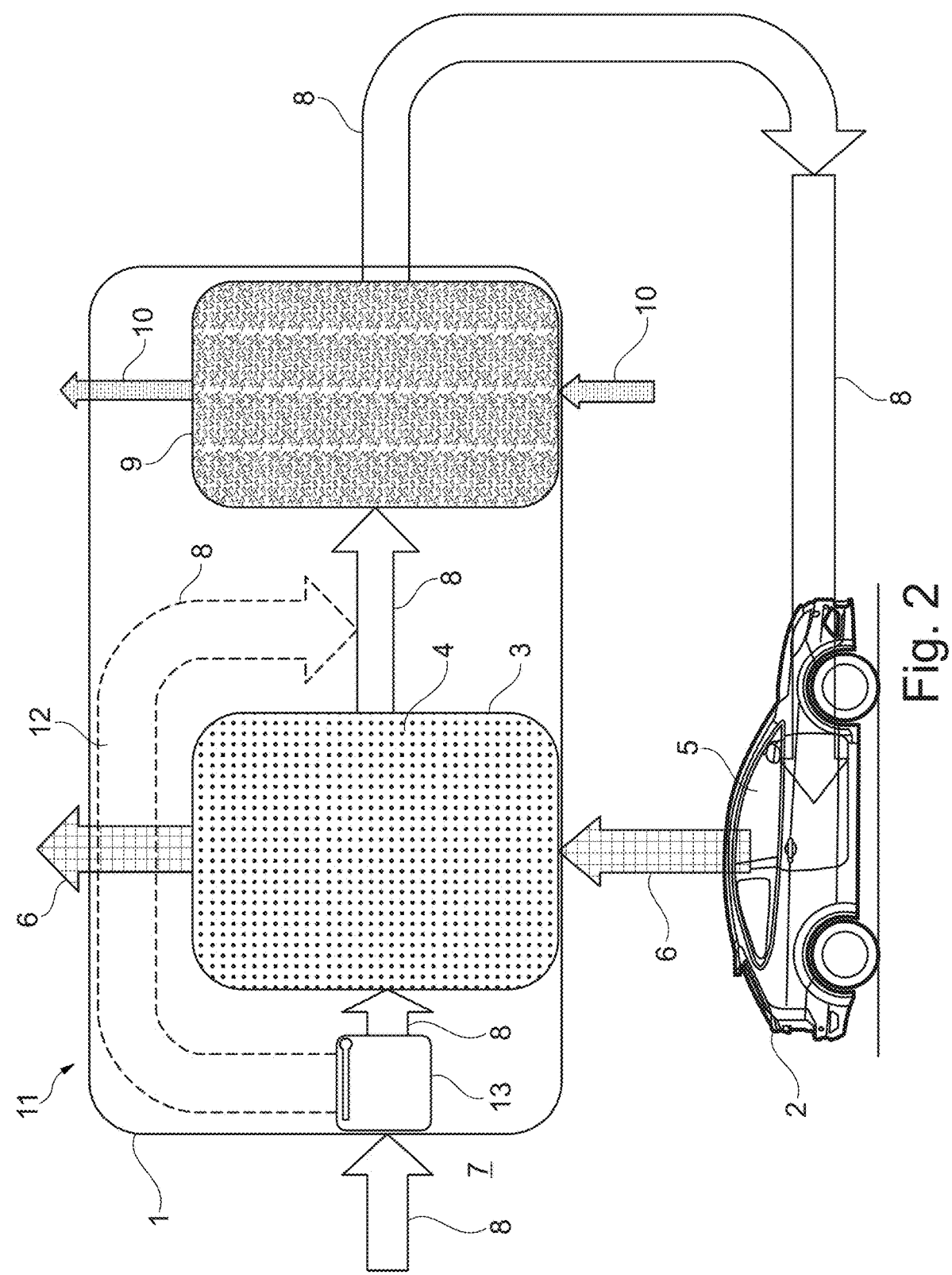
FIG. 2 is a schematic diagram of the vehicle heating system configured in a standard operating mode.

FIG. 2 shows the heating system 1 of FIG. 1 configured to operate in a standard operating mode. In the standard operating mode, the heat storage medium 4 does not perform any function. This may be the case, for example, if the heat storage medium 4 was not charged beforehand, i.e., no heat was supplied to the heat storage medium 4 for storage, or the heat storage medium 4 was already discharged, such that no more heat can be delivered. The standard mode may also be used if the air in the interior 5 of the vehicle 2 is not circulating, i.e., if the interior heating is not operated in an air-circulation mode, but instead intake air 8 from the vehicle environment 7 is to be supplied to the interior 5.

In other words, warm air is to be drawn out of the interior as exhaust air 6, e.g., at a temperature of +15° C., and replaced by initially cold intake air (ambient temperature, e.g., −10° C.). In order to avoid lowering the temperature in the interior 5, or increasing the temperature in the interior 5, the cold intake air 8 may be preheated with the warm exhaust air 6, by the air-air heat exchanger 3.

For this purpose, the intake air 8 and the exhaust air 6 are supplied to the air-air heat exchanger 3, and heat is transferred from the exhaust air 6 to the intake air 8. The bypass 11 is not required in the standard operating mode, and is therefore represented by a broken line in FIG. 2. The flow control device 13 is accordingly set such that the intake air 8 flows through the air-air heat exchanger 3, but not through the bypass channel 12.

After flowing through the air-air heat exchanger 3, the intake air 8 may have a temperature of, for example, −5° C., such that the temperature has been increased by 5° C. in the example. Thus, a large proportion of the heat of the exhaust air 6 routed outward can be reused.

After flowing through the air-air heat exchanger 3, the preheated intake air 8, having, for example, a temperature of −5° C., passes into the air-coolant heat exchanger 9. In the air-coolant heat exchanger 9, the intake air 8 is heated further, in that heat from a coolant 10, which may have a temperature of, for example, +35° C., is transferred to the intake air 8. After flowing through the air-coolant heat exchanger 9, the intake air 8 may have a temperature of, for example, +25° C., i.e., the temperature has been increased by a further 30° C., thus by 35° C. in total. The heated intake air 8 is then supplied to the interior 5 of the vehicle 2.

It should be appreciated that the temperatures and temperature differences stated above and in the following are to be regarded merely as examples, which are intended to illustrate the basic principle of the heating system. The temperatures and temperature differences may vary, according to the specific design of the heat exchangers and the actual temperature conditions.

Figure 3:
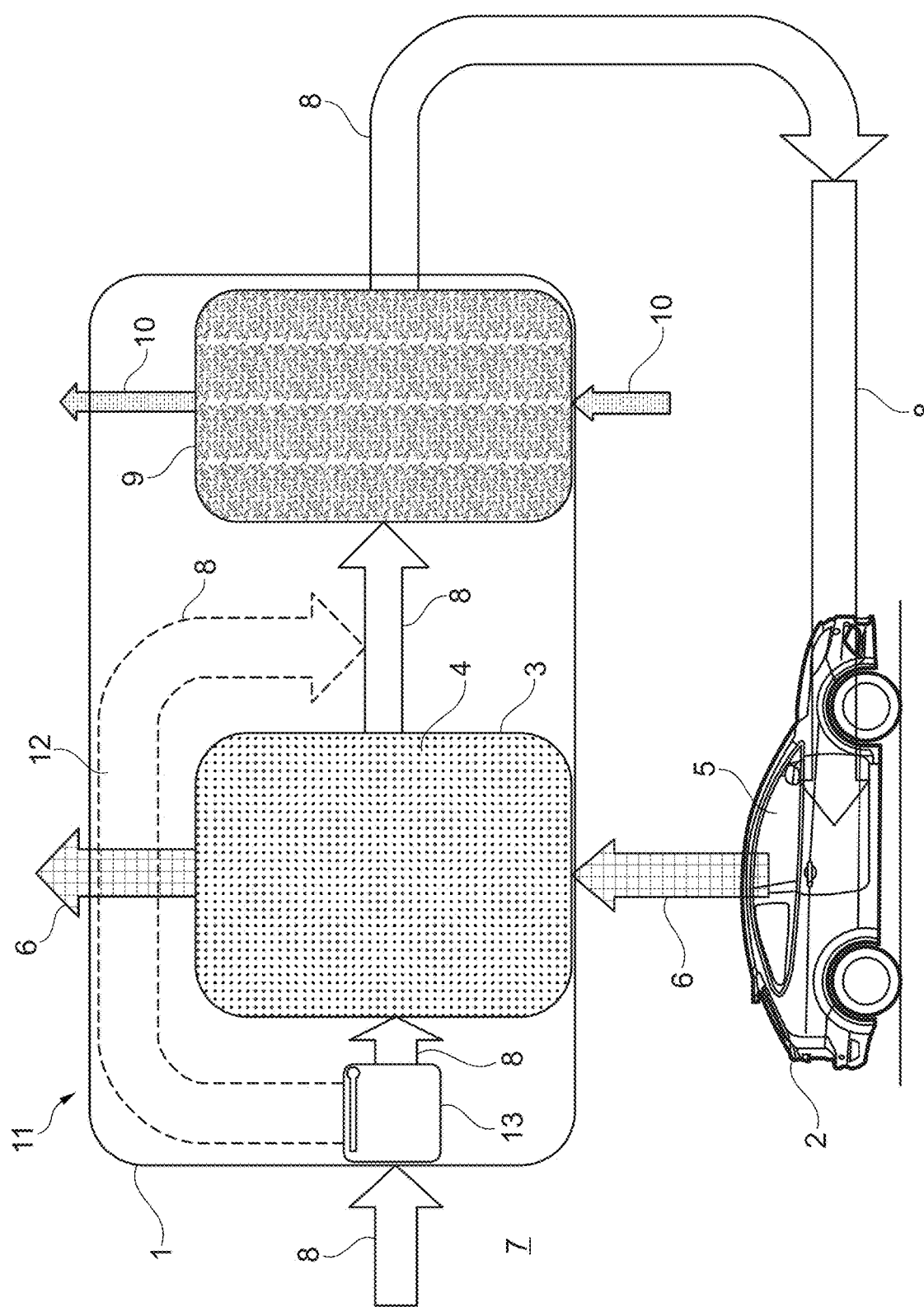
FIG. 3 is a schematic diagram of the vehicle heating system configured in an ancillary-heating operating mode.

FIG. 3 shows the heating system 1 of FIG. 1 in an ancillary-heating operating mode, in which, by contrast with the standard operating mode (see FIG. 2), the intake air 8 is additionally heated by heat transfer from the heat storage medium 4 to the intake air 8. In FIG. 3 this is represented, by contrast with FIG. 2, by a more dense structure of the heat storage medium 4.

The ancillary-heating operating mode may be used, for example, following cold-starting of the vehicle 2. Following the cold start, waste heat of other component parts, such as of an internal combustion engine, is available only to a limited extent, such that the coolant 10 is not heated, or is only slightly heated, and accordingly heating of the intake air 8 by the air-coolant heat exchanger 9 may not be possible, or at most may be possible to a small extent.

Unlike the standard operating mode, in the ancillary-heating operating mode the intake air 8 can be heated to a greater extent by the air-air heat exchanger 3, e.g., from −10° C. to +5° C., i.e., by 15° C. (temperatures otherwise being the same as described in relation to FIG. 2). By use of the air-coolant heat exchanger 9, a further temperature increase by only 20° C. (instead of 30° C. as in the case of FIG. 2) in then required in order to attain the desired temperature of 25° C. for the intake air 8 to be supplied directly to the interior 5.

In the ancillary-heating operating mode, the additional heating power can be further reduced, or the output temperature into the interior 5 can be further increased. In other respects, the description relating to the standard operating mode (FIG. 2) also applies to the ancillary-heating operating mode.

Figure 4:
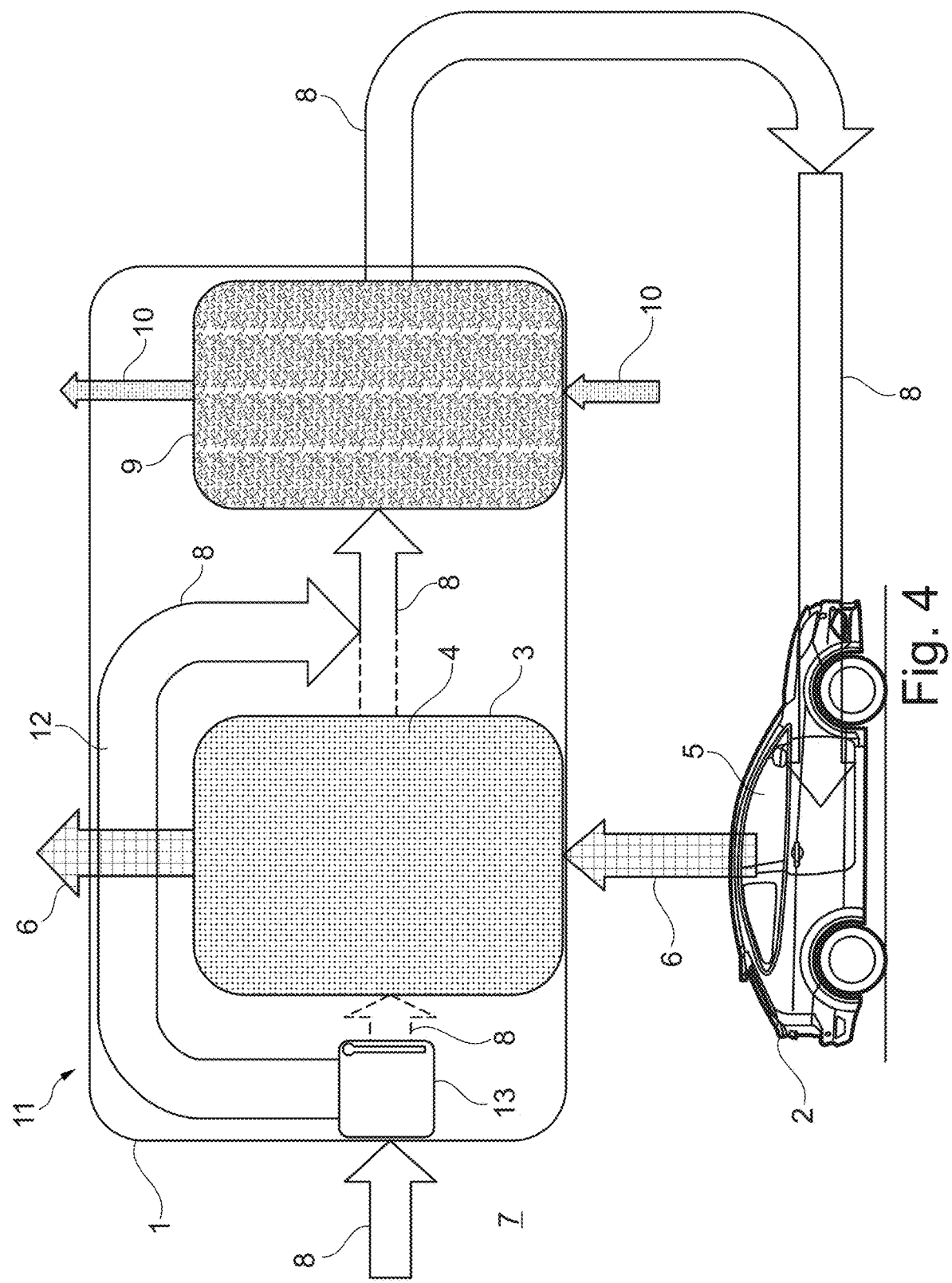
FIG. 4 is a schematic diagram of the vehicle heating system configuration in a heat-storage operating mode.

FIG. 4 shows the heating system 1 of FIG. 1 in a heat-storage operating mode. In the heat-storage operating mode, the heat storage medium 4 can be charged, in that heat from the exhaust air 6 is transferred to the heat storage medium 4. In FIG. 4 this is represented, by contrast with FIGS. 2 and 3, by a yet more dense structure of the heat storage medium 4.

The heat-storage operating mode may be implemented, for example, if heating of the intake air 8 by the air-air heat exchanger 3 is not required, such as for example, in the case of a moderate temperature in the vehicle environment 7 of, for example, +10° C. In this case, heating by heat transfer from the coolant 10 to the intake air 8, in the air-coolant heat exchanger 9, is sufficient for heating the intake air 8. The heat-storage operating mode may furthermore be used if the interior 5 has already been heated and only maintenance of the temperature in the interior 5 is desired, for which, likewise, heating of the intake air 8 by use of heat transfer from the coolant 10 to the intake air 8, in the air-coolant heat exchanger 9, is sufficient.

In the heat-storage mode, for the intake air 8 the air-air heat exchanger 3 is bypassed by use of the bypass 11. For this purpose, the flow control device 13 is or can be positioned such that the intake air 8 flows through the bypass channel 12, but not through the air-air heat exchanger 3. After flowing through the bypass channel 12, the intake air 8, e.g., at a temperature of 10° C., i.e., an unchanged temperature, rejoins the flow path of the standard operating mode or ancillary-heating operating mode, and flows through the air-coolant heat exchanger 9, as described in FIG. 2. In the air-coolant heat exchanger 9, the temperature can be further increased, from +10° C. to +25° C., according to one example.

Optionally, the heat storage medium 4 may also be charged with a warm tempering device, such as with the use of the warm coolant 10, or with electrical heating elements. Advantageously, excess heat may be used for this purpose, e.g., increased waste heat of component parts to be cooled during the driving operation of the vehicle 2 or during a battery charging operation, or also electrical energy from braking phases.

Although the heating system has been illustrated and described in greater detail according to exemplary embodiments, the invention is not limited by the disclosed examples, and other variations may be derived therefrom by persons skilled in the art, without departure from the protective scope of the invention.

The figures are not necessarily exact in detail or true to scale, and may be represented in enlarged or reduced form in order to provide greater clarity. Therefore, functional details disclosed here are not to be understood as limiting, but merely as an illustrative basis that offers guidance, to persons skilled in this field of the art, for applying the present invention in a multiplicity of ways.

The expression "and/or" used here, when it is used in a series of two or more elements, means that each of the listed elements may be used alone, or any combination of two or more of the listed elements may be used. If, for example, a composition containing the components A, B and/or C is described, the composition may contain A alone; B alone; C alone; A and B in combination; A and C in combination; B and C in combination; or A, B and C in combination.

In this disclosure, a heating system is provided for heating the interior of a vehicle that uses both the exhaust-air heat of an airflow emerging from the interior and the waste heat of other components. The heating system has a heat storage function, which can store excess thermal energy for a subsequent use. A phase-change material, for example, may be used as a heat storage medium for this purpose.

The heating system for heating the interior of a vehicle has an air-air heat exchanger having a heat storage medium. The air-air heat exchanger is designed to transfer heat between exhaust air, drawn out of the interior of the vehicle, and intake air, supplied to the interior from the vehicle environment from outside, between the exhaust air and the heat storage medium, and between the intake air and the heat storage medium.

The heat storage medium is to be understood to be a medium, such as for example, a fluid that can absorb heat and deliver it back. The heat storage medium enables heat to be stored from the exhaust air, for a subsequent use if intake air is to be heated at a later point in time. The intake air can thereby be heated more rapidly and more effectively, such that, for example, a more rapid heating of the interior is made possible. As a result of the use of the waste heat of the exhaust air, less additional energy is required. If the additional energy is provided from fuel, the fuel consumption can therefore be reduced. If the additional energy is extracted from the traction battery, the driving range can be increased.

According to various embodiments, the heating system may have an air-coolant heat exchanger, which is designed to transfer heat between a coolant and the intake air. The air-coolant heat exchanger may be arranged upstream or downstream of the air-air heat exchanger, with respect to the direction of flow of the intake air. In other words, the air-air heat exchanger and the air-coolant heat exchanger are arranged in series. An arrangement of the air-coolant heat exchanger downstream of the air-air heat exchanger can render possible a higher efficiency of the air-air heat exchanger, since the coolant temperature is usually higher than the temperature of the exhaust air.

The air-coolant heat exchanger enables the intake air to be heated by a transfer of heat from a heated coolant to the intake air. The coolant may be, for example, a coolant used in the vehicle, such as a coolant used in the engine cooling circuit or for cooling a traction battery, or an additional coolant is provided. The coolant itself may be heated by waste heat of various component parts of the vehicle, for example, by waste heat of the vehicle engine and/or waste heat of a traction battery. Additionally or alternatively, there is also the possibility of an electrical heating of the coolant.

As an alternative or in addition to the heating by the air-air heat exchanger, the intake air may be heated by the air-coolant heat exchanger. Other waste heats may advantageously be used, such that the fuel consumption can be further reduced, or the driving range further increased.

According to further embodiments, the heating system may have a bypass, having a bypass channel and a flow control device, for bypassing of the air-air heat exchanger by the intake air. In other words, the intake air may be routed through the bypass, in order to bypass the air-air heat exchanger. The bypass may preferably be designed such that exclusively the air-air heat exchanger, but not the air-coolant heat exchanger, is bypassed. Heating of the intake air by the air-coolant heat exchanger can then still be effected, even when the air-air heat exchanger is bypassed.

The flow control device may be realized, for example, as a flap or as a valve. It serves to apportion the intake air to the bypass channel and to the air-air heat exchanger. The flow control device may be arranged at the start or at the end of the bypass channel. The flow control device may be controlled by a control unit, which generates a control signal for setting the position of the flow control device. The control signal may be generated, for example, in dependence on the temperature of the intake air and/or in dependence on the temperature of the exhaust air and/or in dependence on the temperature of the coolant, and in dependence on the desired temperature of the interior.

Bypassing of the air-air heat exchanger by the intake air may be advantageous if a transfer of heat between intake air and exhaust air, and between the intake air and the heat storage medium, is not wanted, but a transfer of heat between exhaust air and the heat storage medium is required. This may be the case, for example, if, on the one hand, no heating, or only slight heating, of the intake air is required, which may be effected, for example, by the air-coolant heat exchanger, and on the other hand heat is to be transferred from the exhaust air to the heat storage medium when the heat storage medium is to be recharged. In this case, the bypassing of the air-air heat exchanger renders possible effective charging of the heat storage medium, since no air is delivered to the intake air from the air to air heat exchanger 3.

According to one embodiment, the heat storage medium may be a phase-change material (PCM). In this embodiment, the heat storage medium may also be referred to as a latent-heat storage medium. Useful as a latent-heat storage medium are phase-change materials whose latent heat of fusion, heat of solution or absorption heat is great than the heat that they are able to store on the basis of their normal specific thermal capacity. Thus, besides the specific thermal capacity, the latent heat of the phase transition from liquid to solid, is also available for the storage of thermal energy.

A phase-change material may be used having a phase transition, from liquid to solid and vice versa, which may involve solidification or melting that is exploited. The phase transition temperature of the solid-liquid phase transition, in one embodiment, is in a temperature range of between 0° C. and 40° C., further preferably between 5° C. and 30° C., particularly preferably between 10° C. and 25° C. For example, salt hydrates, mixtures containing salt hydrates or paraffins may be used as phase-change materials. The use of a phase-change material as a heat storage medium advantageously enables a large quantity of heat to be stored, with a small space requirement for the medium.

According to one embodiment, the heating system may have electrical heating elements, wherein heat is able to be supplied to the heat storage medium by the electrical heating elements. The electrical heating elements may be operated with excess electrical energy, such as for example, with electrical energy generated during braking phases of an electric vehicle or hybrid electric vehicle. This generated energy can thus be reused, advantageously, for heating the heat storage medium, and need not be otherwise dissipated.

According to further embodiments, heat may be able to be supplied to the heat storage medium by a tempering device or medium. The tempering device may be, for example, the previously described coolant. For example, waste heat from component parts to be cooled, such as, for example, the internal combustion engine, waste heat of other components, such as for example, components of an electric drive system, or waste heat produced during the battery charging operation, may be transferred to the tempering device or medium and from the latter to the heat storage medium. The waste heat can thereby be supplied for an expedient use, and the overall energy balance can be improved.

A motor vehicle is equipped with the described heating system for heating the interior of the vehicle. A motor vehicle is to be understood to mean a vehicle driven by an engine, such as for example, a land vehicle, aircraft or water-craft. The motor vehicle may be realized as an electric or hybrid electric vehicle including a mild hybrid electric vehicle or full hybrid electric vehicle.

The advantages of the motor vehicle according to the disclosure correspond to those of the heating system and its corresponding embodiments. Moreover, the heating system is particularly advantageous in the case of a motor vehicle, since it can be instrumental in the observance of strict legal requirements in respect of the allowable emission of air pollutants, in that the fuel consumption is reduced.

The interior of the motor vehicle that is to be heated may be sealed and/or insulated. An unwanted transfer of heat, between the interior and the vehicle environment, can thereby be avoided, and the energy balance can be further improved.

A method for heating an interior of a vehicle comprises supplying intake air, from the vehicle environment, to an air-air heat exchanger having a heat storage medium, supplying exhaust air, from the interior, to the air-air heat exchanger, and transferring heat from the exhaust air to the intake air, from the exhaust air to the heat storage medium, and/or from the heat storage medium to the intake air, via the air-air heat exchanger.

The method may be executed, for example, by the heating system according to the disclosure explained above. To that extent, the above statements explaining the heating system according to the disclosure also serve to describe the method according to one embodiment. The advantages of the method correspond to those of the heating system and its corresponding embodiments.

In the method, a phase-change material may preferably be used as a heat storage medium. The heat transfer operations mentioned are preferably not performed simultaneously, but with a time shift, such as for example, in succession. For example, the transferring of heat from the exhaust air to the intake air, and the transferring of heat from the heat storage medium to the intake air, may be performed simultaneously, but the transferring of heat from the exhaust air to the heat storage medium occur at a different point in time.

According to various embodiments, the method may comprise supplying the intake air to an air-coolant heat exchanger arranged upstream or downstream of the air-air heat exchanger, and transferring heat from a coolant to the intake air by the air-coolant heat exchanger.

According to further embodiments, heat may be transferred from the exhaust air to the intake air, and/or heat may be transferred from the heat storage medium to the intake air, insofar as heating of the intake air is required. This may be necessary, for example, following a cold start or in the case of cold external temperatures, to enable the temperature in the interior to be raised rapidly. The transfer of heat from the heat storage medium to the intake air may be effected, in particular, if waste heat of other components can only be made available to the air-coolant heat exchanger to a limited extent via the coolant. In this way, an additional (electrical) heating of the intake air can be avoided, or at least reduced, and/or the output temperature of the intake air into the interior can be increased.

According to further embodiments, heat may be transferred from the exhaust air to the heat storage medium, insofar as no heating of the intake air by the air-air heat exchanger is required. This may be the case, for example, if heating of the intake air is not required, or if the intake air can be heated sufficiently by the air-coolant heat exchanger, e.g., in the case of an already heated interior, the temperature of which is no longer to be increased, but merely maintained. In other words, excess heat in the exhaust air may be transferred to the heat storage medium. Excess thermal energy is present insofar as a temperature gradient prevails between the temperature of the exhaust air and the temperature of the heat storage medium.

If heat is transferred from the exhaust air to the heat storage medium, then, advantageously, the air-air heat exchanger may be bypassed by the intake air. A bypass, for example, as previously described, may be used for this purpose. The excess heat in the exhaust air can thus be used to charge the heat storage medium, and is not transferred to the intake air.

According to further embodiments, the method may comprise supplying heat to the heat storage medium by a tempering device or medium and/or by electrical heating elements. The tempering device or medium in this case may be heated by waste heat of an internal combustion engine, waste heat of other components, such as for example, components of an electric drive system, or by waste heat produced during a battery charging operation, and/or electrical energy generated during a braking operation may be supplied to the electrical heating elements. This can further improve the energy balance.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A heating system for heating an interior of a vehicle, comprising:
    an air-air heat exchanger having a heat storage medium and configured to transfer heat between exhaust air, drawn out of the interior, and intake air, supplied to the interior from a vehicle environment, between the exhaust air and the heat storage medium, and between the intake air and the heat storage medium;
    an air-coolant heat exchanger configured to transfer heat between a coolant and the intake air;
    a bypass having a bypass channel and flow control device for bypassing of the air-air heat exchanger by the intake air; and
    a control unit configured to control the flow control device to direct the intake air toward at least one of the bypass channel and the air-air heat exchanger based on temperature of the interior of the vehicle and a temperature of the coolant.

2. The heating system as claimed in claim 1, wherein the air-coolant heat exchanger is arranged upstream or downstream of the air-air heat exchanger, with respect to the direction of flow of the intake air.

3. The heating system as claimed in claim 1, wherein the heat storage medium comprises a phase-change material.

4. The heating system as claimed in claim 1 further comprising electrical heater elements for supplying heat to the heat storage medium.

5. The heating system as claimed in claim 1, wherein heat is supplied to the heat storage medium by a temper device.

6. The heating system as claimed in claim 4, wherein electrical energy, generated during a braking operation, is supplied to the electrical heater elements or a temper device is heated by waste heat of an internal combustion engine, waste heat of other components, or by waste heat produced during a battery charging operation.

7. The heating system as claimed in claim 1, wherein the heating system is located on a motor vehicle.

8. A motor vehicle comprising:
    an interior;
    a heating system for heating the interior and comprising an air-air heat exchanger having a heat storage medium, wherein the air-air heat exchanger is configured to transfer heat between exhaust air, drawn out of the interior, and intake air, supplied to the interior from a vehicle environment, between the exhaust air and the heat storage medium, and between the intake air and the heat storage medium;
    an air-coolant heat exchanger configured to transfer heat between a coolant and the intake air;
    a bypass having a bypass channel and flow control device for bypassing of the air-air heat exchanger by the intake air; and
    a control unit configured to control the flow control device to direct the intake air toward at least one of the bypass channel, the air-coolant heat exchanger, and the air-air heat exchanger based on temperature of the interior of the vehicle and a temperature of the coolant.

9. The motor vehicle as claimed in claim 8, wherein the air-coolant heat exchanger being arranged upstream or downstream of the air-air heat exchanger, with respect to the direction of flow of the intake air.

10. The motor vehicle as claimed in claim 8, wherein the heating system further comprises electrical heater elements for supplying heat to the heat storage medium.

11. The motor vehicle as claimed in claim 8, wherein heat is supplied to the heat storage medium by a temper device.

12. A method for heating an interior of a vehicle, comprising:
    supplying intake air from a vehicle environment to an air-air heat exchanger having a heat storage medium;
    supplying exhaust air from the interior to the air-air heat exchanger;
    supplying the intake air to an air-coolant heat exchanger to transfer heat between a coolant and the intake air;
    controlling a flow control device to direct the intake air toward at least one of a bypass channel and the air-air heat exchanger based on temperature of an interior of the vehicle;
    controlling the flow control device to direct intake air toward at least one of the bypass channel and the air-coolant heat exchanger based on a temperature of the coolant; and
    transferring heat from the exhaust air to the directed intake air, from the exhaust air to the heat storage medium, and/or from the heat storage medium to the directed intake air by use of the air-air heat exchanger.

13. The method as claimed in claim 12 further comprising:
    supplying the intake air to the air-coolant heat exchanger arranged upstream or downstream of the air-air heat exchanger; and
    transferring heat from a coolant to the intake air via the air-coolant heat exchanger.

14. The method as claimed in claim 12, wherein heat is transferred from the exhaust air to the intake air, and/or heat is transferred from the heat storage medium to the intake air, insofar as heating of the intake air is required.

15. The method as claimed in claim 12, wherein heat is transferred from the exhaust air to the heat storage medium, insofar as no heating of the intake air via the air-air heat exchanger is required.

16. The method as claimed in claim 15 further comprising bypassing of the air-air heat exchanger by the intake air.

17. The method as claimed in claim 12 further comprising supplying heat to the heat storage medium via a temper device and/or via electrical heater elements.

18. The method as claimed in claim 17, wherein the temper device is heated by waste heat of an internal combustion engine, waste heat of other components, or by waste heat produced during a battery charging operation, and/or electrical energy generated during a braking operation being supplied to the electrical heater elements.

* * * * *